(12) United States Patent
Kruppa

(10) Patent No.: US 11,975,816 B2
(45) Date of Patent: May 7, 2024

(54) HIGH-EFFICIENCY PROPELLER FOR AIRCRAFT

(71) Applicant: László Kruppa, Budapest (HU)

(72) Inventor: László Kruppa, Budapest (HU)

( * ) Notice: Subject to any disclaimer, the term of this patent is extended or adjusted under 35 U.S.C. 154(b) by 163 days.

(21) Appl. No.: 17/771,825

(22) PCT Filed: Sep. 8, 2020

(86) PCT No.: PCT/IB2020/058337
§ 371 (c)(1),
(2) Date: Apr. 26, 2022

(87) PCT Pub. No.: WO2021/140368
PCT Pub. Date: Jul. 15, 2021

(65) Prior Publication Data
US 2022/0402594 A1 Dec. 22, 2022

(30) Foreign Application Priority Data
Jan. 10, 2020 (HU) .................................. 2000013

(51) Int. Cl.
*B64C 11/32* (2006.01)
(52) U.S. Cl.
CPC .................... *B64C 11/32* (2013.01)
(58) Field of Classification Search
CPC ......... B64C 11/32; B64C 11/36; B64C 11/34; B64C 11/38; B64C 11/40; B64C 11/42; B64C 27/35; B64C 2027/7222; F03D 1/0648; F03D 1/0633; F03D 1/0641; F05B 2240/31; F05B 2240/311; F05B 2240/313
See application file for complete search history.

(56) References Cited

U.S. PATENT DOCUMENTS

| | | | | |
|---|---|---|---|---|
| 2,496,169 | A | * | 1/1950 | Lochman ................ B64C 11/34 29/889.6 |
| 2,627,928 | A | | 2/1953 | Mullgardt |
| 3,227,221 | A | | 1/1966 | You |
| 4,137,010 | A | | 1/1979 | Stroub |
| 4,648,798 | A | * | 3/1987 | Voisard .................. B64C 11/38 416/154 |

(Continued)

FOREIGN PATENT DOCUMENTS

| | | |
|---|---|---|
| CN | 102887222 A | 1/2013 |
| DE | 2164648 A1 | 6/1973 |

(Continued)

OTHER PUBLICATIONS

English machine translation of EP 2402246A1, Nov. 30, 2023.*

*Primary Examiner* — Christopher Verdier
(74) *Attorney, Agent, or Firm* — Bayramoglu Law Offices LLC (57) ABSTRACT

An improved efficiency propeller for aircraft includes a blade structure mounted onto a propeller hub, a servo unit, and a cantilevered base. A distinctive feature of the disclosure is that the blade structure includes a main mast, which is mounted onto a propeller hub and forms the spine of the leading edge of the blade structure, and at least one secondary mast aligned with the main mast, and turning spacers with struts are mounted onto the main mast, and the struts are covered by lateral pieces of a skin module, and the overlapping and flexible lateral pieces of the skin module form a skin.

9 Claims, 9 Drawing Sheets

(56) References Cited

U.S. PATENT DOCUMENTS

| | | | |
|---|---|---|---|
| 4,720,244 A * | 1/1988 | Kluppel | ............... B29C 70/025 |
| | | | 416/241 A |
| 5,284,419 A | 2/1994 | Lutz | |
| 2004/0185725 A1 | 9/2004 | Wilkie | |
| 2007/0217917 A1 | 9/2007 | Khan | |
| 2011/0211959 A1 | 9/2011 | Bianchi et al. | |
| 2014/0154074 A1 | 6/2014 | Zientek et al. | |
| 2019/0211841 A1 | 7/2019 | Cottrell et al. | |

FOREIGN PATENT DOCUMENTS

| | | | |
|---|---|---|---|
| EP | 0522035 A1 | 1/1993 | |
| EP | 2402246 A1 | 1/2012 | |
| EP | 3406522 A1 | 11/2018 | |
| GB | 2464678 A | 4/2010 | |
| WO | 9115399 A1 | 10/1991 | |
| WO | WO-2011/089277 A1 * | 7/2011 | |
| WO | 2013074545 A1 | 5/2013 | |

* cited by examiner

HIGH-EFFICIENCY PROPELLER FOR AIRCRAFT

CROSS REFERENCE TO THE RELATED APPLICATIONS

This application is the national phase entry of International Application No. PCT/IB2020/058337, filed on Sep. 8, 2020, which is based upon and claims priority to Hungarian Patent Application No. P2000013, filed on Jan. 10, 2020.

TECHNICAL FIELD

The subject of the invention is an improved efficiency propeller for aircraft that has a modular skin structure and a blade structure with variable shape.

BACKGROUND

Common and popular propellers are based on the tilt-rotor technique, which is a successor of the over 30 years old Osprey technique. Four aircraft using this technique crashed between 1991 and 2000. This problem is not solved by the tilt-rotor technique, as a phenomenon known as vortex ring state (VRS), when the strong descent of an aircraft causes its rotor to be engulfed in its own vortices resulting in a significant loss of lift, may occur when either technique is used. When in VRS, the blades stall considerably. The working range of currently known airscrews is quite limited, and it needs to be decided at the time of manufacturing if an airscrew is to be used at high or low speed. This is a significant limitation in particular for fixed pitch airscrews. Usually, an aircraft with such propulsion flies at low speed, as an aircraft fitted with fast airscrews requires external support for take-off. Furthermore, the rotary speed of the engine is increased to achieve higher speed, so that the ends of blades achieve extreme peripheral speed. Even though this method may be used to increase speed to a limited extent, it does not allow an aircraft to fully utilize the flyable subsonic speed range using the same airscrew. The issue of selecting airscrews is covered in Elements Propeller and Helicopter Aerodynamics (Daniel O. Dommasch, Pitman, USA, 1953), point 3.2, and A repülés mechanikája (Rácz Elemér, Tankönyvkiadó, 1953), Chapter 10. These books are still considered to be of fundamental importance. Both books recommend the use of airscrews with variable pitch with a view to expanding the working range, noting that the limitations remain still applicable. It seems that professionals working on the field of aerodynamics grew to accept the limited working range of airscrews. This narrow working range is trivial and can be examined thoroughly using the blade element model used as part of airscrew design methods. Angle differences, that is desirable and possible differences, can be calculated using vector drawings based on the blade element model, making it feasible to graphically display the limitations of possible compensations of adjustable airscrews.

The state of the art includes numerous solutions in which there is a series of profiles rotatably mounted around a main support rod, sometimes pulled into a flexible stocking, and twisting is achieved by moving the two end-point profiles.

The device described in patent documents Nos. EP0522035 (A1) and U.S. Pat. No. 5,284,419 (A) is a propeller with blades which can be twisted. In addition to the fixed main rod (which cannot be moved relative to the axis of the propeller blade), rods that can be moved in both directions run along the blade, with further cross-bars arranged perpendicular to it, holding the air-contacting surface pieces. The middle skin elements passively follow the displacement of the rod as the control structure twists two specified skin elements relative to each other by displacing the rods. The skin elements thus form a twisted surface around the central axis of the flexibly suspended set of sections. The patent document discusses separately the problem that surface irregularities can occur where pieces of skin elements are fitted; this can be improved, for example, if the skin elements are able to twist. This solution improves the possibly oldest solution for changing the shape of blades by smoothing out the displacement of adjacent sections. The disadvantages of this solution include its complexity, significant weight, and its lack of or limited support for wider (e.g., elliptical) blade shapes. It is suitable only for helicopter rotor blades.

Chinese patent document No. CN102887222A describes a blade that includes modular strips with an outer flexible cover. According to the patent description, it also includes a fixed and solid rod that runs along the entire length of the blade. The blade is divided into slices, so it is divided from one direction only (but not in parallel to the rod), and the sides of the slices are perpendicular to the rod. These are placed onto the rod running along the blade. The rod is surrounded by a tubular shaft along the length of the blade, to which all the wing slices are attached. The movement of the tubular shaft is followed by the wing slices. At the distal end of the blade, the tubular shaft is attached to the end of the rod running along the blade in a fixed/firm manner. The twisting structure is located at the base of the blade, and it moves the tubular shaft in this case. The wing twists as the tubular shaft turns. By changing the properties and parameters of the tubular shaft, the twisting of the blade can be varied. According to the patent description, an "arbitrary" (i.e., non-linear) function is required, according to which the angle of twist varies along the radius. The twistable profiles are attached to the main rod by springs whose spring constant varies according to the "arbitrary" function along the radius. The range of resultant twist is determined by the hardness of the springs.

Patent document No. DE 2164648 describes a similar solution where the twistable blade is covered by an outer cover that is fastened to the inner structure. Inside is a rigid plate, cone-shaped adjusting tube and strips, and an elliptical skin. The radial distribution of the twist is not linear, but follows an "arbitrary" function. A separate control mechanism ensures that the extent of radial twist of the elements follows to the above "arbitrary" function. The signal received from the primary control of the propeller is processed by the separate control mechanism using its own internal algorithm and, based on the result thus obtained, it drives and controls the twisting of the various blade slices.

In the modular blade structure described in document No US20070217917 (A1), the individual blade elements have a three-dimensional profile, the end of the blade has an advantageous line, and the weight distribution is more advantageous compared to other solutions. The size of the "effective zone" at the edge of the blade can be increased.

British patent document No. GB2464678A describes twistable propeller blades for use in helicopter rotors. This solution also includes a fixed rod ("mast") running along the blade, which is also fixed to the end of the blade. The rod is connected to the blade only at the end, and the rod and the blade can be rotated in other parts of the blade. The twisted arrangement is achieved by turning the blade base, which is assisted by several actuators and oscillating discs. The blade base is always twisted to a less significant extent than blade ends.

The invention described in patent document No. US20140154074 (A1) is also used for helicopter propellers. The end of the blade is moved by an actuating mechanism that is located outside the blade but acts on the end of the blade by means of a rod guided in the blade. This may also be paired with a similar actuating mechanism that rotates the blade base along similar principles, but optionally in the opposite direction. With this design, the rotor blade can also be tilted and screwed.

Patent document No. US20110211959 (A1) on adaptively twisting rotor blades describes a solution for the special compensation needs of long and flexible (therefore oscillating) helicopter rotor blades. An anisotropic inner strip made of a composite material runs along the inside of the blade as a frame, which is fixed to the outer cover at certain points inside the wing. Twisting is caused by the centrifugal force resulting from the movement of the blade, not by an actuator mechanism.

A common disadvantage of the earliest solutions is that only a linear distribution of the twist angle can be achieved along the longitudinal axis of the blade, i.e., the radius. For this reason, with the exception of the design point, stalling zones and braking zones (i.e., losses in terms of propulsive force) appear along the length of the blade at different rotary speeds and/or speeds.

Some solutions suggest a long, flexible "stocking" into which the blade structure is to be hidden. On the one hand, a disadvantage of such a solution is that the stocking can only be fixed at a single location, i.e., the base, and very high tensile stresses are generated at higher speeds near the point of fixation. On the other hand, another problem can be caused by the wrinkling of the stockings. This threatens to distort the cross-section of the blade sections at larger twist angles. In such a situation, amorphous and spontaneous profiles are formed that cause losses, instead of the aerodynamically preferred profile.

More recently, the use of memory metals and elastic (non-complex, sometimes only corrugated) cover materials has also emerged in the field of torsion technology. Shape-changing technology is being developed for aircraft wings rather than propellers.

The vast majority of propellers representing the state of the art can be divided into two main groups. These include the fixed pitch and variable pitch or adjustable propellers. A common feature of both groups is that the blades used are rigid bodies manufactured with a certain constant twist. These blades only fit a certain angular distribution of the resultant of the airflows along the blade (the resultant wind) along the radius of the propeller. When the angular distribution of the resultant wind differs from the calculated one, the efficiency of the propellers deteriorates. In the case of adjustable propellers, this deterioration can be partially compensated by rotating the rigid blades; however, the poorly performing and inefficient zone at the blade ends and the blade base still gradually increases.

Overall, the working range of contemporary propellers is quite narrow, and several disadvantages follow from this fact. First, it needs to be decided at the time of manufacturing if a propeller is to be used at high or low speed. This is a significant limitation in particular for fixed pitch propellers. Usually, an aircraft with such propulsion flies at low speed, as an aircraft fitted with fast propellers requires external support for take-off (e.g., launch from a catapult). The rotary speed of the engine can be increased to achieve higher speed; however, in such a scenario the ends of blades achieve extreme peripheral speed. It approaches and could even exceed the speed of sound. Even though this method may be used to increase speed to a limited extent, it does not allow an aircraft to fully utilize the flyable subsonic speed range using the same propeller.

Working range means the range of axial speed (Vax) and/or ADVANCE RATIO (J) in which the propeller efficiency (n) is sufficiently high or acceptable. As explained in detail above, literature considers the narrow working range of propellers a given feature.

Skins implemented using known flexible films, memory and/or corrugated metal sheets are characterized by their intensive deformation and therefore their resistance to deformation. On the outer blade surface, softer and harder surface parts alternate, which can also cause an increase in wind resistance depending on the flow rate (i.e., the external pressure can make the surface uneven if its stiffness is different in some places). With larger twists, "stocking-based" solutions are no longer able to accurately track rod displacements, become extremely deformed, wrinkled, and blade section profiles lose their aerodynamically advantageous shape. It is a professional prejudice that the hermetic nature of the skin is important, which imposes limitations in design and manufacture.

SUMMARY

The solution according to the invention is a torsion blade for propellers, where changing the shape of the blade can be controlled from outside of the blade. In and of itself, the desire to use torsion technique is as old as the use of aircraft.

The purpose of the invention is to eliminate the errors and shortcomings of the previous solutions, to provide a better approach to optimal twisting, and to implement a structure which is more efficient than solutions representing the state of the art, in which the twisting angle can take different values along the longitudinal axis of the blade, i.e., the radius, meaning that the angle of twist per radius unit (degree of specific torsion) may be different at the base of the blade and near the blade end. It is also a purpose to be interchangeable with the currently prevalent propellers, and to avoid stalls, thereby improving its safety compared to known solutions.

The inventive activity is based on the recognition that, in view of the changes in the resultant of the airflows along the blade, the ideal or near-ideal blade angle distribution can be maintained if, together with the wind, the geometry of the blades also changes. This requires the blades to be made of a sail-like, i.e., deformable, and thus non-rigid material. This is because the efficiency of the propeller increases in the case of a propeller with a twisted blade where the change in angle (torsion) along the blade is non-linear. A blade shape that adapts to the result of the airflows along the blade can be provided by moving the special inner skeleton of the deformable blades, where the displacement of the support rods twists the blade, continuously ensuring that the blade sections are precisely adjusted to the current optimum, i.e., to the position angle that is optimal in the given situation.

In line with the desired purpose, the most general implementation form of the solution according to the invention may be realized. The various implementation forms are described in the sub-claims.

The invention is an improved propeller for aircraft, which includes a blade structure mounted onto a propeller hub, a servo unit, and a cantilevered base. A distinctive feature of the invention is that the blade structure includes a main mast, which is mounted onto a propeller hub and forms the spine of the leading edge of the blade structure, and at least one secondary mast aligned with the main mast, and turning spacers with struts are mounted onto the main mast, and the struts are covered by lateral pieces of skin module, and the overlapping and flexible lateral pieces of skin modules together form a skin.

In one implementation form of the invention, the secondary masts are mounted onto a secondary mast base piece that can move around the axis of rotation of the propeller hub, and the secondary masts are connected to a tilting hub of spaced batten. The struts of the spacers with struts embrace in a fork-like manner the one or more secondary masts that can turn them.

In another possible implementation form, the axis of the main mast is parallel to the leading edge of the blade structure, and the main mast and the parts of the spacers with struts that are mounted onto the main mast are covered by frontal pieces of skin modules that are connected to the lateral pieces of skin module, and the lateral pieces of skin module and the frontal pieces of skin module form a modular unit of skin. The lateral pieces of skin module are connected to each other so that they can move relative to each other, and the lateral pieces of skin module are connected to one or more neighbouring spacers with struts so that each lateral piece of skin module is fixed onto the strut of at least one spacer with struts, and the lateral piece of skin module 6 is assigned to the strut of a neighbouring spacer with struts so that the neighbouring spacer with struts and the lateral piece of skin module can move relative to each other, and the lateral piece of skin module crosses, at least in part, the parallel line following the axis of the strut which parallel line is the line of intersection of, on the one hand, the plane that crosses the axis of the given neighbouring spacer with struts and is perpendicular to the surface of the blade structure and, on the other hand, the plane of the surface of the blade structure.

In another implementation form, the larger the distance from the propeller hub, the smaller the diameter of the cross-section of the main mast and/or the secondary masts becomes. The mast base is connected to the propeller hub through a hub of spaced batten, and the hub of spaced batten is associated with a gear fixed to the hub of spaced batten, and a rack and a slider plate is associated with the gear fixed to the hub of spaced batten. The blade structure is closed by a flexible blade tip element. The skin is not closed completely. The cantilevered base is fixed to the hydraulic cylinder through the hollow propeller hub, and the blade structures are connected to the standing cantilevered base with a bearing located in the propeller hub.

In the course of implementing our invention, we ensured that the propeller would not stall, thereby eliminating a major source of threat for propeller-driven aircraft. The reason for this is that the function describing the spatial deformation of the blades is identical to the function describing the changes of resultant wind along the radius. The fan-like skeleton creates grid points that can be moved in space and lie on the twisted surface describing the radial distribution of the resultant wind direction.

In addition to improving safety, this solution also overcomes the professional prejudice presented above. As mentioned above, the narrow working speed range of propellers is considered as a given feature in literature and by members of the profession. Axial speed necessarily changes during the flight cycle, as an aircraft needs to take off and land. Aircrafts also perform manoeuvres, accelerate, slow down, turn, etc. This means that the propeller is frequently operated under parameters that deviate from its design point. The further the design point is left behind, the more the propeller efficiency decreases; it varies around 20 to 30% during a significant portion of the flight cycle. The blades currently used are rigid bodies, which, when turned, make the angle difference between the resultant wind and the blade sections both better and worse at the same time. However, not even the improvement experienced is sufficient to allow an aircraft to fly through the entire subsonic speed spectrum. On the contrary, our invention maintains the ideal (or close-to-ideal) blade angle distribution by using shape changing blades instead of rigid blades, meaning that the geometry of the blades is changed according to the changes of resultant wind.

BRIEF DESCRIPTION OF THE DRAWINGS

The invention is presented in more detail using drawings of possible implementation forms.

On the attached drawings.

DETAILED DESCRIPTION OF THE EMBODIMENTS

Figure 1:
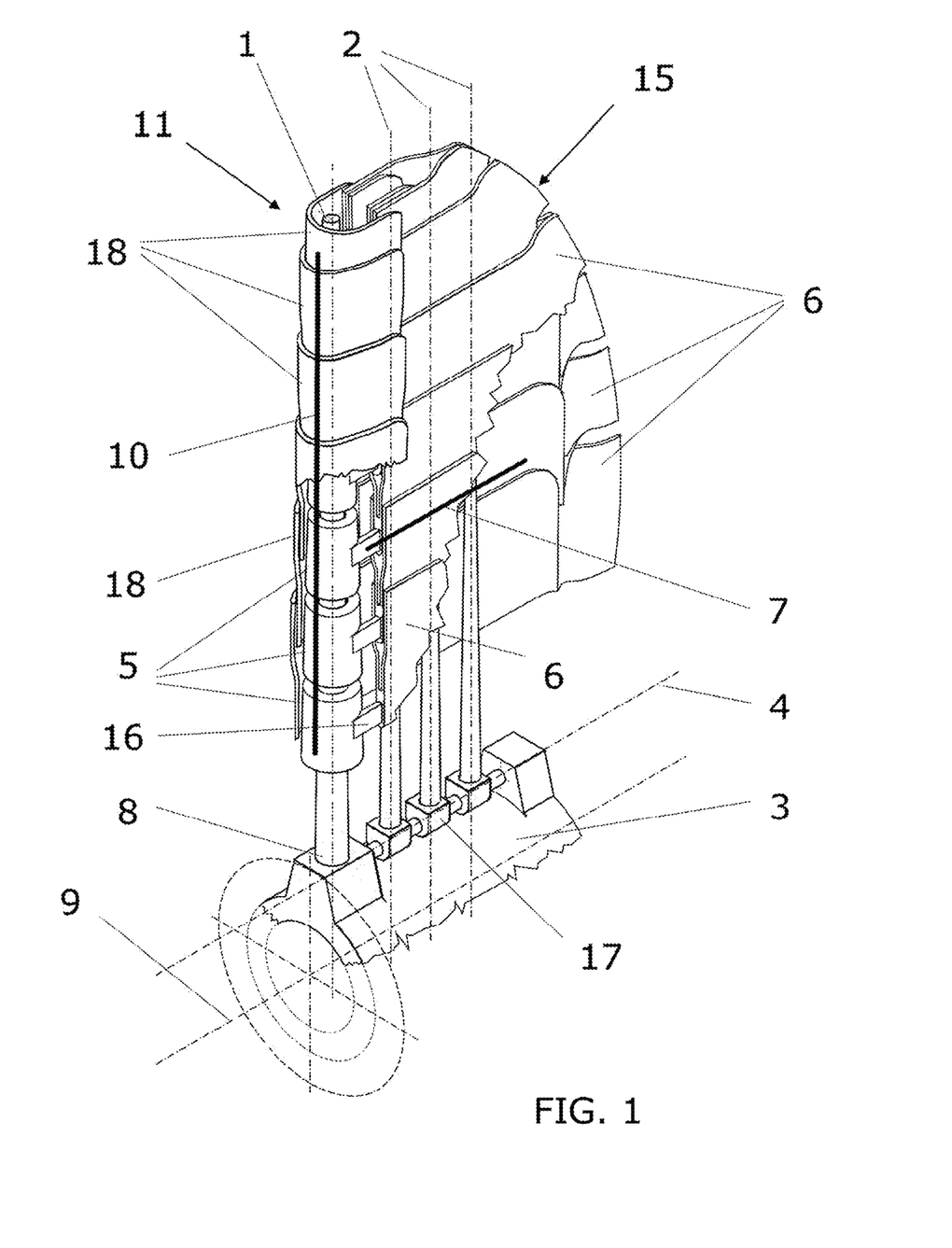
FIG. 1 shows a schematic drawing of the blade structure with breakouts.

FIG. 1 shows a shape-changing blade structure 11. It shows the main mast 1, the secondary masts 2, the eccentric propeller hub 3, the secondary mast base pieces 17, the axis of rotation 4 of the turning secondary masts 2, the axis of rotation 9 of the propeller hub 3 and the propeller, the mast base 8 that fixes the main mast 1, and the spacers with struts 5 located on the main mast 1 that form a unit with the fork-like struts 16. Lateral pieces of skin module 6 are located on the struts 16, and, together with the frontal pieces of skin module 18, they form the skin 15. The lateral pieces of skin module 6 are made of a bendable and flexible material, such as a composite Kevlar® material, and are suitably covered by Teflon. FIG. 1 also shows the parallel line 7 and the leading edge 10.

The main mast 1 is fixed to the propeller hub 3 through the mast base 8, and they rotate together. As an example, the bases of three secondary masts 2 of different length are fixed into the secondary mast base piece 17. The secondary mast base piece 17 can turn in a fan-like manner around the mast base 8 and the identical fixed axis having an axis of rotation 4 located between the stud forming part of the propeller hub 3. The main mast 1 is located as close as possible to the leading edge 10; in fact, it forms the spine of the leading edge 10 by way of the spacers with struts 5 and the frontal pieces of skin module 18. The spacers with struts 5 are connected to the main mast 1 by such means, e.g., bearings, that allow displacement relative to the main mast 1 only in a plane perpendicular to the main mast 1 along the main mast 1 as axis.

Figure 2:
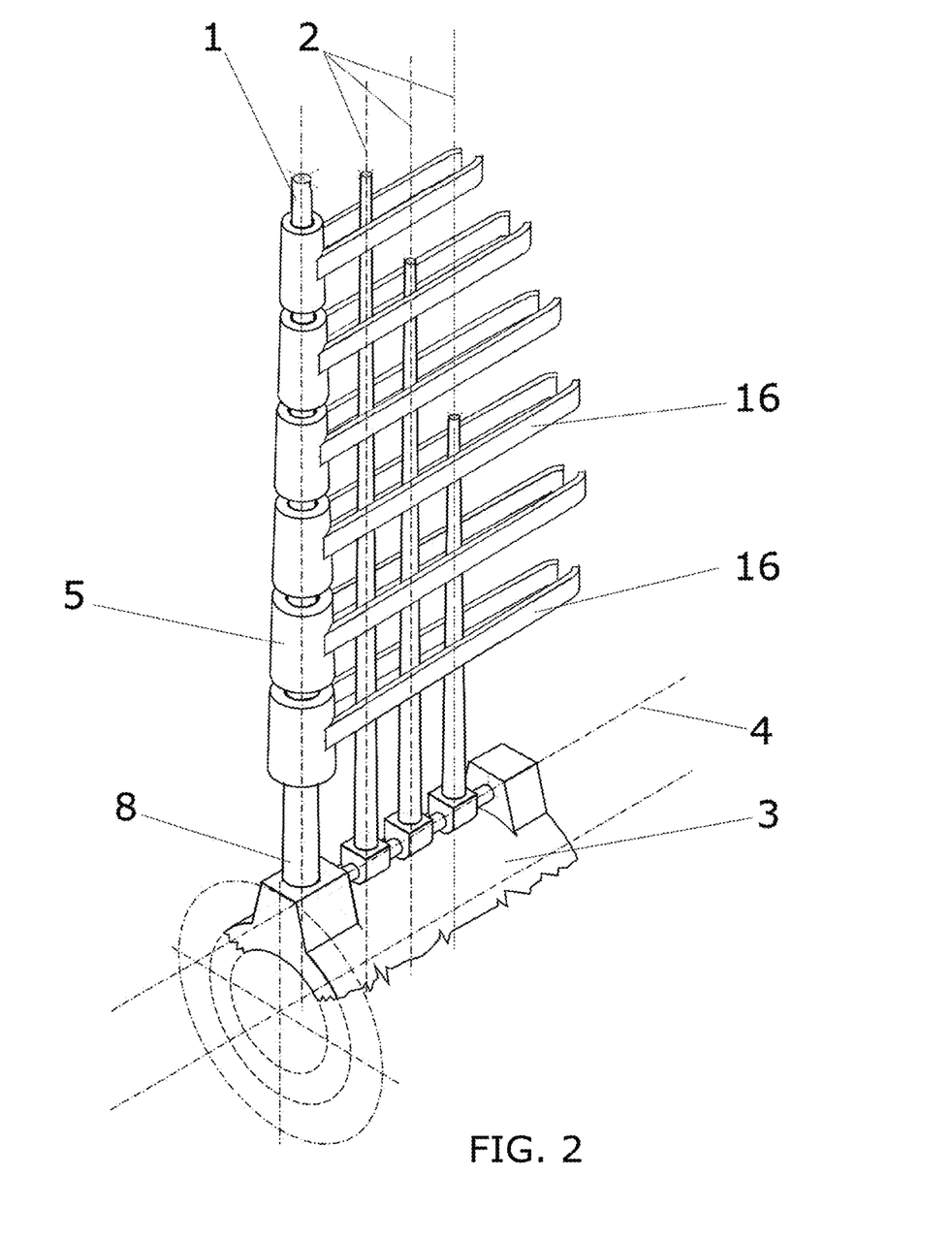
FIG. 2 shows a schematic drawing of the skeleton of the blade structure.

FIG. 2 shows the main mast 1, the secondary masts 2, the mast base 8 of the main mast 1, the spacer with struts 5, the propeller hub 3, the axis of rotation 4 of the secondary masts, and the strut 16 of the spacers with struts 5. The struts 16 of the spacer with struts 5 has the following distinctive features:
- they determine the aerodynamic characteristics of sections of the blade structure 11;
- they determine the planform of the blade structure 11;
- they drive the displaceable secondary mast 2;
- they hold the lateral pieces of skin module 6.

The smoothness of the surface of the blade structure 11 may be improved by increasing the number of the spacers with struts 5, by refining the modular distribution, and structural deviation from the ideal blade arch line may be reduced.

The larger the distance from the propeller hub 3, the smaller the diameter of the cross-section of the main mast 1 and/or the secondary masts 2 becomes. However, in another implementation form, the diameters remain unchanged. The profile of the blade structure 11 may be further shaped and refined by using a conic skeleton. Thus, the skin 15 sections can become thinner and thinner approaching the blade ends of the blade structure 11, which reduces weight and allows for a more even distribution of mechanical tension.

With a view to ensuring the feasibility of various blade planforms (e.g., long, narrow), further displaceable blade support rods (without own drive) may be installed in the blade structure 11 in addition to the two main skeleton components, i.e., the main mast 1 and one secondary mast 2 identified as a minimum requirement. More than two secondary masts 2 need to be applied in all situations where the planform of the blade limits the length of the strut 16 of the spacer with struts 5. In such situations, the strut 16 cannot reach the secondary masts 2 displaced by the servo unit 13 (presented on FIG. 5; internal structure shown on FIG. 7) over a given radius value.

The mast-like rods perform passive movement, i.e., they have no drive of their own. They are moved and adjusted appropriately by the spacers with struts 5 that are close to the axis of rotation 4 of the secondary masts 2 and reach the secondary masts 2. As the blade radius increases, the regulatory role of the secondary masts 2 is always taken over by the rod that performs passive movements closest to the leading edge 10. The necessary number and individual length of the mast-like rods that perform passive movement are determined by the stiffness/rigidity requirements of the blade structure 11 and the blade planform to be achieved.

Figure 3:
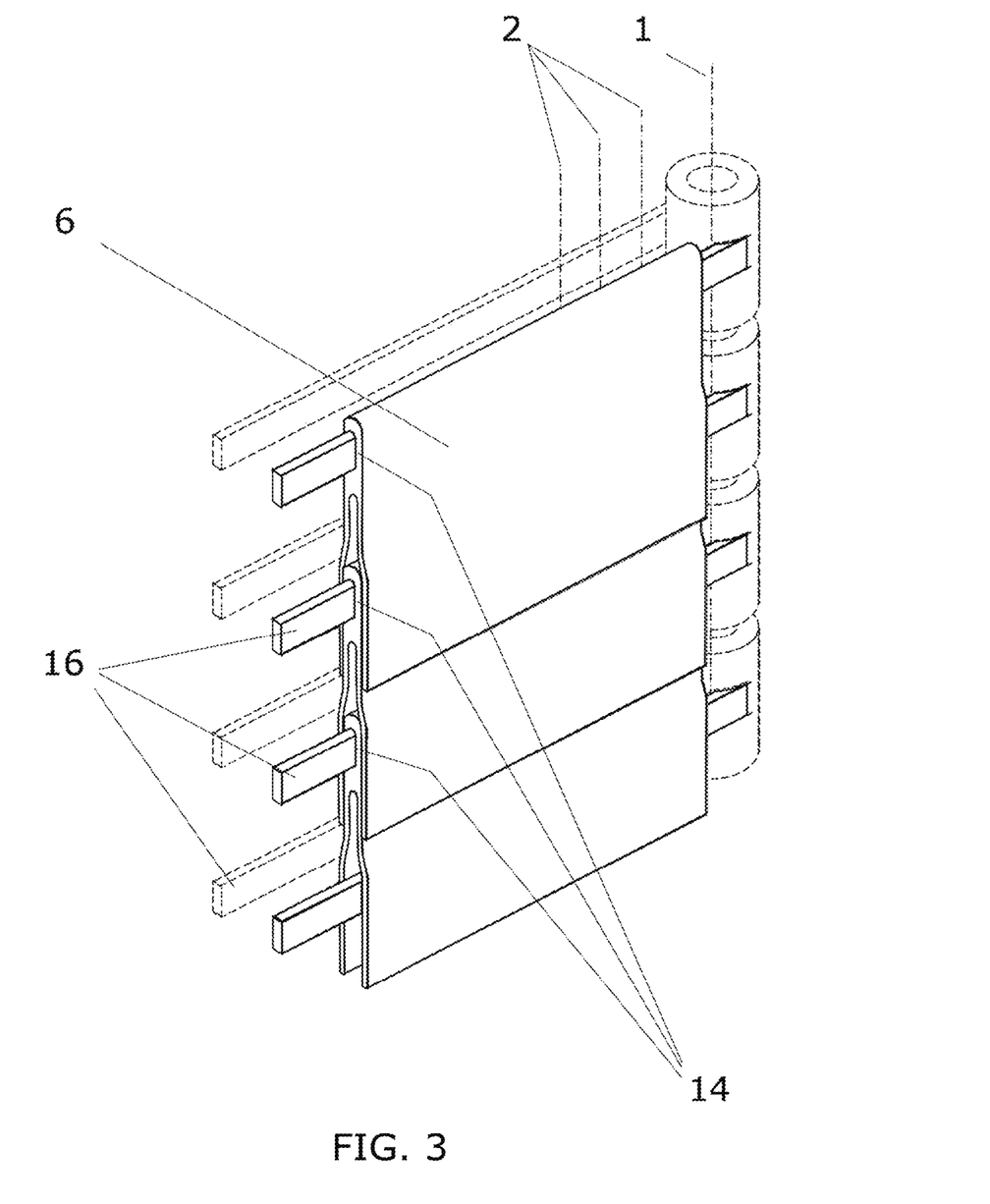
FIG. 3 shows a folding drawing of the cover of the blade structure.

FIG. 3 shows the "folding plan" of the lateral pieces of skin module 6 located on the struts 16. The lateral pieces of skin module 6 are fitted with strut sockets 14 that can be pulled onto the strut 16.

The lateral pieces of skin module 6 are responsible for transforming the necessarily changing configuration defined only by its main points by the main mast 1, the secondary masts 2, and the struts 16 of the spacers with struts 5 into a blade surface that is aerodynamically efficient at all times, so that, in the meantime, they do not hinder the free movement of the secondary masts 2 and struts 16 working in the internal layers of the blade.

One side of the lateral piece of skin module 6 is connected to the spacer with struts 5 so that the strut socket 14 located in the blade skin lateral piece of skin module 6 fits onto the fork-like branch of the strut 16, and the lateral piece of skin module 6 surrounds the strut 16 from all directions. The lateral piece of skin module 6 thus pulled on is connected to the strut 16 without any displacement. If necessary, the rigidity of the fixing can be increased by gluing, moulding, or another similar method.

At the same time, the neighbouring blade skin lateral pieces of skin module 6 are connected to each other so that they remain displaceable relative to each other. The blade skin lateral pieces of skin module 6 are also connected to each other, so that they remain displaceable relative to each other: they can move and slide on each other and relative to each other. The recommended arrangement of the modular skin elements 23 is similar to the arrangement of scales of fish or roof tiles, where the elements are connected to each other by partial overlapping, but they are not fixed to each other. The lateral piece of skin module 6 is located next to the neighbouring strut 16 so that it embraces it in a cloak-like manner from two directions (from the directions of the two external sheets of the propeller blade).

The lateral pieces of skin module 6 are connected to each other so that they can move relative to each other, and the lateral pieces of skin module 6 are connected to at least two neighbouring spacers with struts 5 (with the exception of the outmost spacer with struts 5 in radial direction, which is necessarily connected to only one piece) so that each lateral piece of skin module 6 is fixed onto the strut 16 of at least one spacer with struts 5, while the same lateral piece of skin module 6 is assigned to the strut 16 of at least one neighbouring spacer with struts 5 so that the neighbouring spacer with struts 16 and the lateral piece of skin module 6 can move relative to each other. The lateral piece of skin module 6 crosses, at least in part, the parallel line 7 following the axis of the strut 16 which parallel line 7 is the line of intersection of, on the one hand, the plane that crosses the axis of the given neighbouring strut 16 and is perpendicular to the surface of the blade structure 11 and, on the other hand, the plane of the surface of the blade structure 11.

The number and size of the interconnected lateral pieces of skin module 6 forming the modular skin 15 can be determined freely. This also means that the length of the struts 16, i.e., the radius of the propeller and the size of the blade surface, can be increased as necessary.

It is irrelevant from the perspective of aerodynamics whether the skin 15 of the propeller is hermetically sealed or not. Drag and efficiency of the propeller is mostly determined by the entirety of surface parts having an influence of airflow. Whether or not parts of the skin 15 are connected to each other in a hermetically sealed manner is irrelevant from this perspective. This recognition makes it possible to overcome the professional prejudice concerning bag-like covers, as described as part of the state of the art, and allows us to implement a more advantageous modular skin 15.

Figure 4:
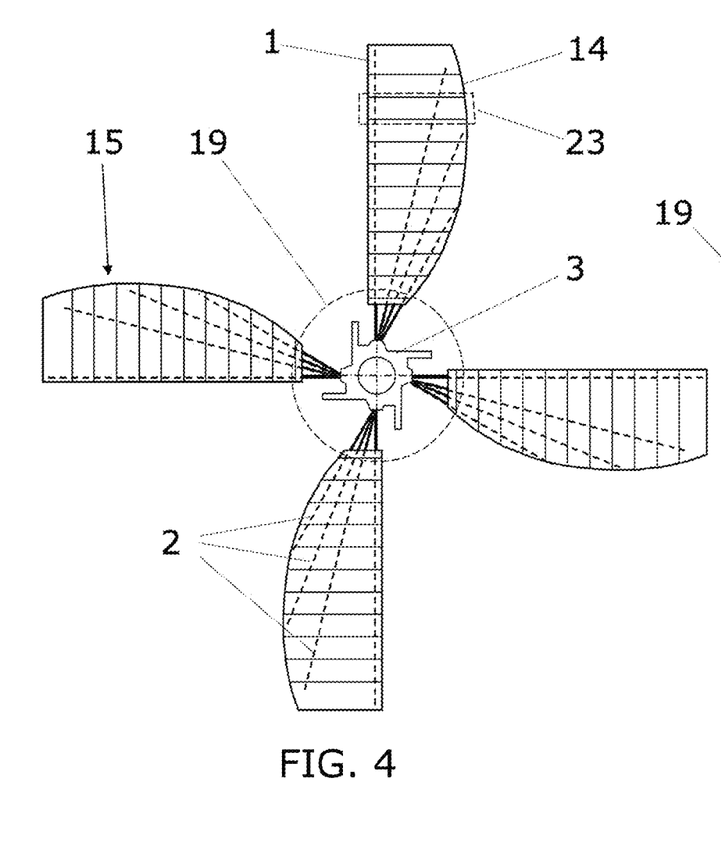
FIG. 4 shows a front-view drawing of an implementation form of the propeller with an eccentric propeller hub.

FIG. 4 shows, as an example, the frontal view of a propeller with an eccentric propeller hub 3. It shows the secondary masts 2 opened in a fan-like manner, the modular unit of skin 23 formed by the lateral piece of skin module 6 (depicted in FIG. 1) and the frontal piece of skin module 18 (depicted in FIG. 1), and the skin 15 formed by the modular units of skin 23. FIG. 4 also shows the outline of the known propeller cone 19 of the propellers.

Figure 5:
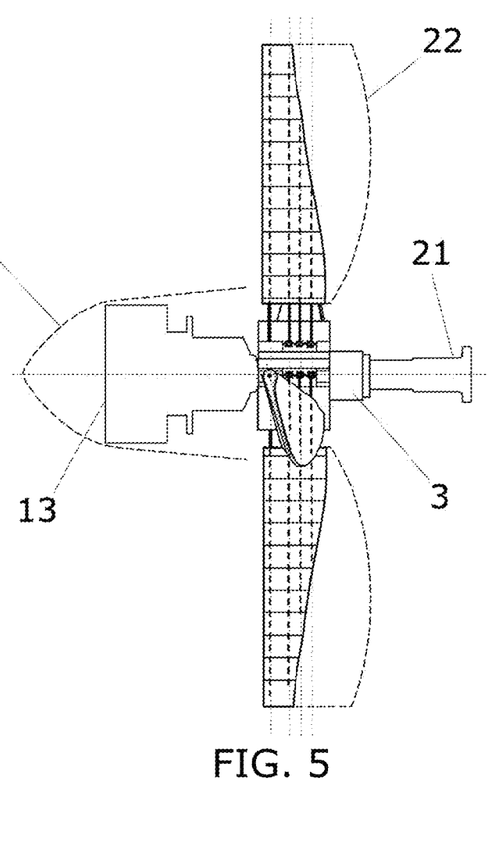
FIG. 5 shows a side view of FIG. 4.

FIG. 5 shows a side-view of the servo unit 13, the surrounding propeller cone 19, the propeller hub 3, and the cantilevered base 21 with a shortened structure. In this situation, the blades are shown in feathered position of blade 22. The internal skeleton is moved by the servo unit 13, which also includes the hydraulic cylinder 24 (depicted in FIG. 7), by moving the secondary masts 2. The movements causing the blade structure 11, 22 to change its shape may be controlled via remote control through controllers located in the skeleton according to the wishes of the pilot, or they may be controlled by an automatic regulator system.

Figures 6, 7:
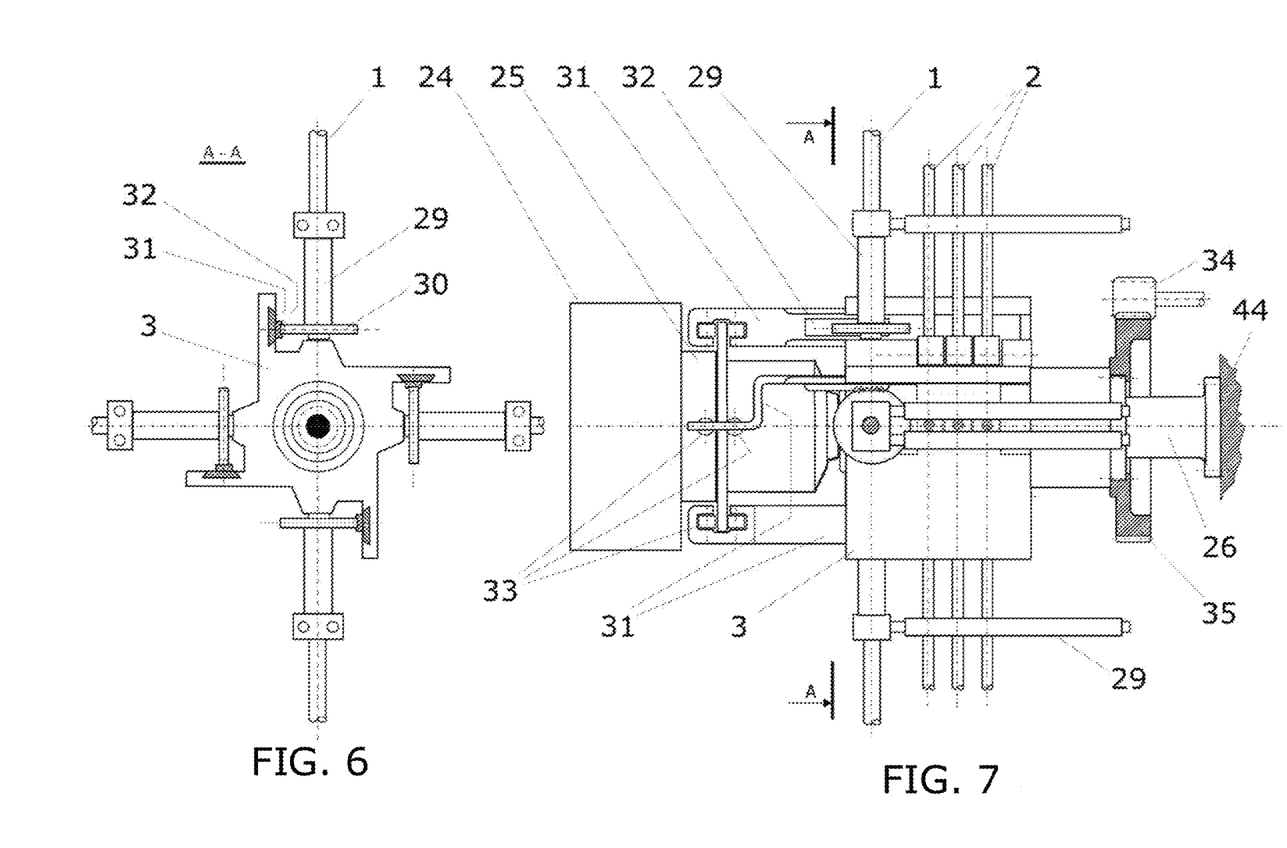
FIG. 6 shows an A-A section of FIG. 7.
FIG. 7 shows a side view drawing of the propeller structure fitted with an eccentric propeller hub.

FIG. 7, and FIG. 6 showing the A-A section thereof, shows an implementation form of a hydraulic power transmission solution. FIG. 6 shows the eccentric propeller hub 3, the gear fixed to the hub of spaced batten 30, the slider plate 31, the rack 32, the hub of spaced batten 29, and the main mast 1. FIG. 7 also shows the secondary masts 2, the cantilevered base 26 and its piston 25, the driving gear 34, the gear 35, and the aircraft body 44 of the aircraft or drone. Our implementation forms include three secondary masts 2 for each blade structure 11, but their number may change from one to more pieces, depending on the size and shape of the blades. On FIG. 7, a hydraulic cylinder 24, located in a central position and operating in two directions, serves as power transmission source for moving internal skeleton of the blade structure 11 and the struts 16 forming a single part with the spacer with struts 5. The piston 25 of the hydraulic cylinder 24 ends in an accurately formed external edge, the surface of which is suitable for leading the rollers 33 that move at high speed. The hydraulic cylinder 24 is fixed onto the cantilevered base 26 that is connected to the aircraft body, and it is not involved in the rotating movement of the propeller.

The cantilevered base 26 needs to be solid enough to transmit all pushing, pulling, and bending force that arises between the propeller and the aircraft body. The cantilevered base 26 is not exposed to any twisting force, as it is transmitted by the driving gear 34. The blade structures 11 are installed into the hollow eccentric propeller hub 3, which is mounted onto the cantilevered base 26 through bearings 27. Thus, the twisting torque required for rotating the blades are transmitted from the driving motor to the eccentric propeller hub 3 through the driving gear 34 and the large gear 35. As pulling and pushing forces also arise on the blade structures 11, the bearing 27 is also capable of transmitting such forces, meaning that the bearing 27 is a ball or inverted tapered roller bearing.

This design of the hydraulics makes it possible to control and operate deformation of any number of torsion blade structures 11 using a single central hydraulic cylinder 24. With a view to twisting the rotating blade structures 11, the displacement of the non-rotating piston 25 needs to be transmitted to the main mast 1 and secondary masts 2 of the blades. In this implementation form, a transmission chain including rollers 33, steel slider plates 31, racks 32, and a suitably converted hub of spaced batten 29 is used for that purpose.

The characteristics of the hub of spaced batten 29 include the followings:
  it can rotate around the main mast 1 freely;
  it includes a lower geared part;
  it does not include any lateral piece of skin module 6;
  it is responsible for tilting the secondary masts 2 exactly in the angle specified by the pilot or the regulating system;
  it has a rigid build.

In normal operation, the blade structures 11 perform rotating movements, while the cantilevered base 26 and the hydraulic cylinder 24 remain in a stationary position relative to the aircraft body. The slider plates 31 rotate with the blade structures 11 and hold onto the edge of the piston 25 using their openings fitted with rollers. The notches cut into the hollow and eccentric propeller hub 3 form a rail and allow the slider plates 31 to move in an axial direction. The connection fitted with rollers and the axially free movement allowed in the notches make it possible for the slider plates 31 to follow the axial displacement of the piston 25 continuously.

The rack 32 parts fixed onto the slider plates 31 are connected to the gears on base-facing part of the hub of spaced batten 29. Thus, the hub of spaced batten 29 is forced to follow the movement of the slider plates 31 around the main mast 1 as axis. The struts 16, which turn in a plane that is perpendicular to the main mast 1, not only tilt and turn the secondary masts 2 around their axis of rotation, but also fix them in their new position.

The secondary masts 2, driven by the hub of spaced batten 29, open and close in a fan-like manner, as they are allowed to do so by their arrangement and the position of their axis of rotation. The purpose of the arrangement is to ensure that the useful blade surface created primarily by the main mast 1 and the secondary masts 2 (i.e., the internal skeleton) with the support of the spacers with struts 5, the lateral pieces of skin module 6, and the frontal pieces of skin module 18 can form slices with radially adjusting angles that follow the radial distribution of resultant wind at all times (i.e., dynamically), creating a twist altogether.

Figure 8:
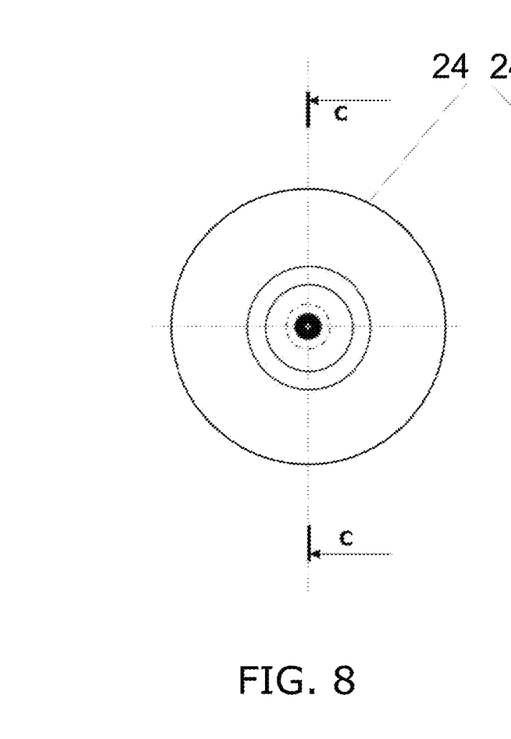
FIG. 8 shows a C-C section of FIG. 9.
Figure 9:
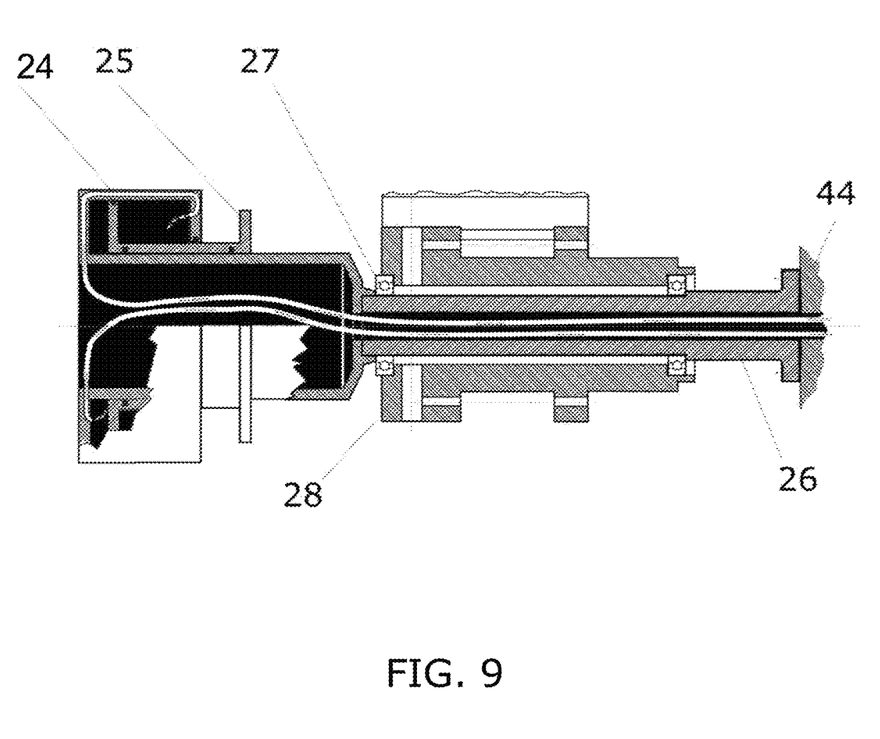
FIG. 9 shows the drawing of a longitudinal section of the hydraulic cylinder of the propeller.

FIG. 8 shows a hydraulic cylinder 24, while FIG. 9 shows a C-C section of the hydraulic cylinder 24 shown on FIG. 8 and the intersected eccentric propeller hub 28. FIG. 9 also shows the piston 25, the bearing 27, the cantilevered base 26, and the aircraft body 44.

Figures 10, 11:
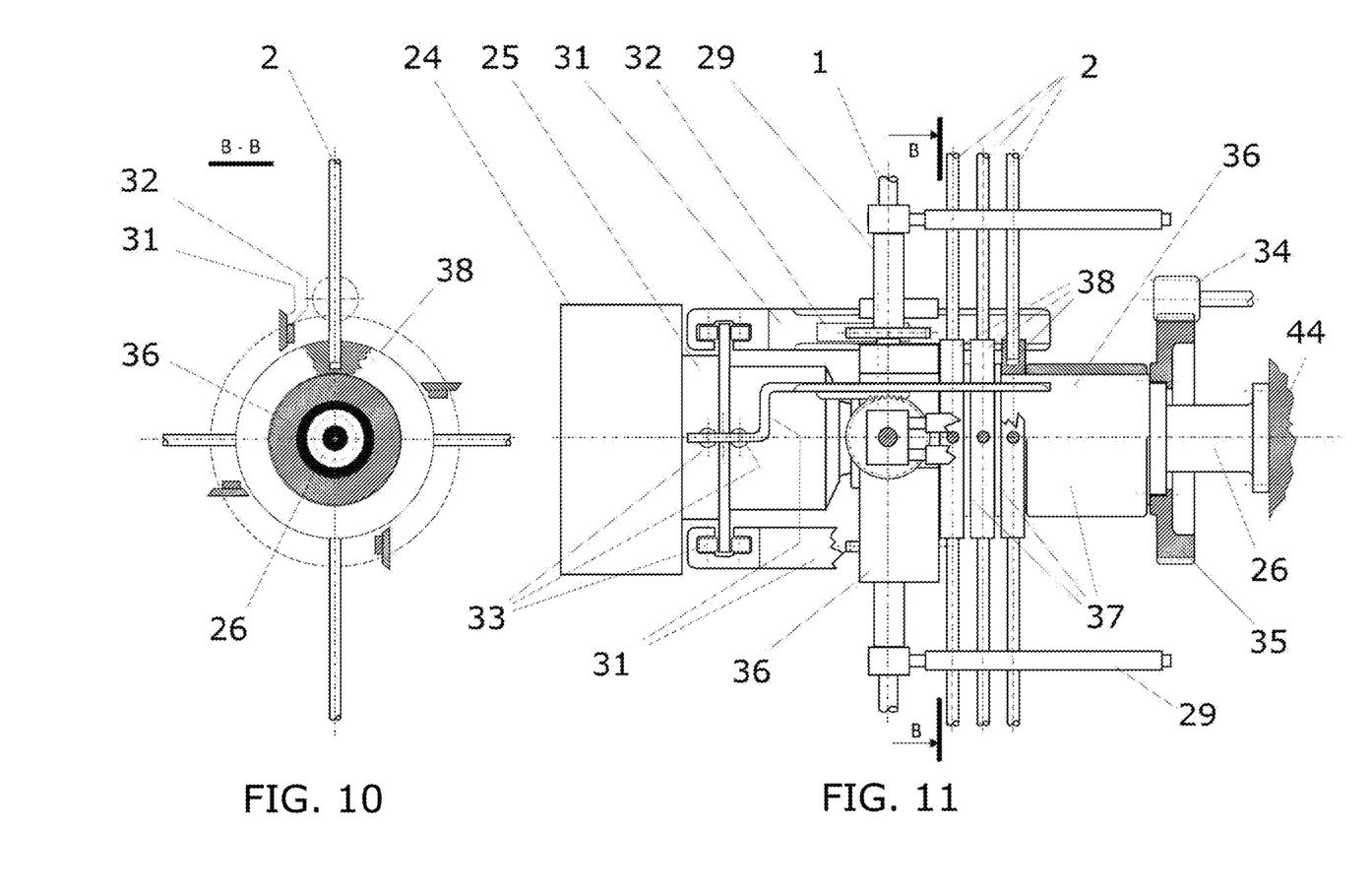
FIG. 10 shows a B-B section of FIG. 11.
FIG. 11 shows a side view drawing of the propeller structure fitted with a concentric propeller hub.

FIGS. 10 and 11 show implementation forms that are similar to those presented on FIGS. 6 and 7, respectively, but in this implementation form, the hollow propeller hub is a concentric propeller hub 36. FIG. 10 shows the secondary mast 2, the cantilevered base 26, the slider plate 31, the rack 32, the propeller hub 36, and the secondary mast base ring 38. Furthermore, FIG. 11 also shows the main mast 1, the rollers 33, the spacers 37, the hub of spaced batten 29, the gear 35, the driving gear 34, and the aircraft body 44. The secondary mast 2 is inserted either into an eccentric propeller hub 3 at the secondary mast base piece 17, or into a concentric propeller hub 36 at the ring-shaped secondary mast base piece 38. The main difference between the cantilevered base 21 and the cantilevered base 26, as well as the concentric propeller hub 28 and the propeller hub 36, as shown on FIG. 5, is that the cylindric sections are longer in the implementation form using the cantilevered base 26 and the concentric propeller hub 36.

The implementation forms of the eccentric propeller hub 3, 28 and the propeller hub 36 have advantages and disadvantages, as follows. When an eccentric solution is used, the axis of rotation 4 of the turning axis of the secondary masts 2 shown on FIG. 1 is parallel to the axis of rotation 9 of the propeller; when a concentric solution is used, the two axes of rotation 4, 9 are one and the same.

An eccentric solution offers a propeller hub 3 that is easier to repair and maintain, but the mathematical error (i.e., the difference between the curves) may not reach zero. This means that efficiency may degrade at lower speeds at the base of the blades; however, a braking air-wing mode cannot appear in either scenario. When a concentric solution is used, the curves, i.e., the direction of speed vectors and the chord lines of the blade structure sections, are 100% identical in terms of mathematics in the entire radius range. For this reason, this solution provides the greatest possible improvement in efficiency. However, a disadvantage is that the entire propeller needs to be disassembled to repair the blade structure 11. When an eccentric solution is used, the secondary masts 2 (FIG. 1) are supported by the secondary mast base pieces 17; when a concentric solution is used, the secondary masts 2 are supported by the ring-shaped secondary mast base rings 38 shown on FIGS. 10 and 11.

Figure 12:
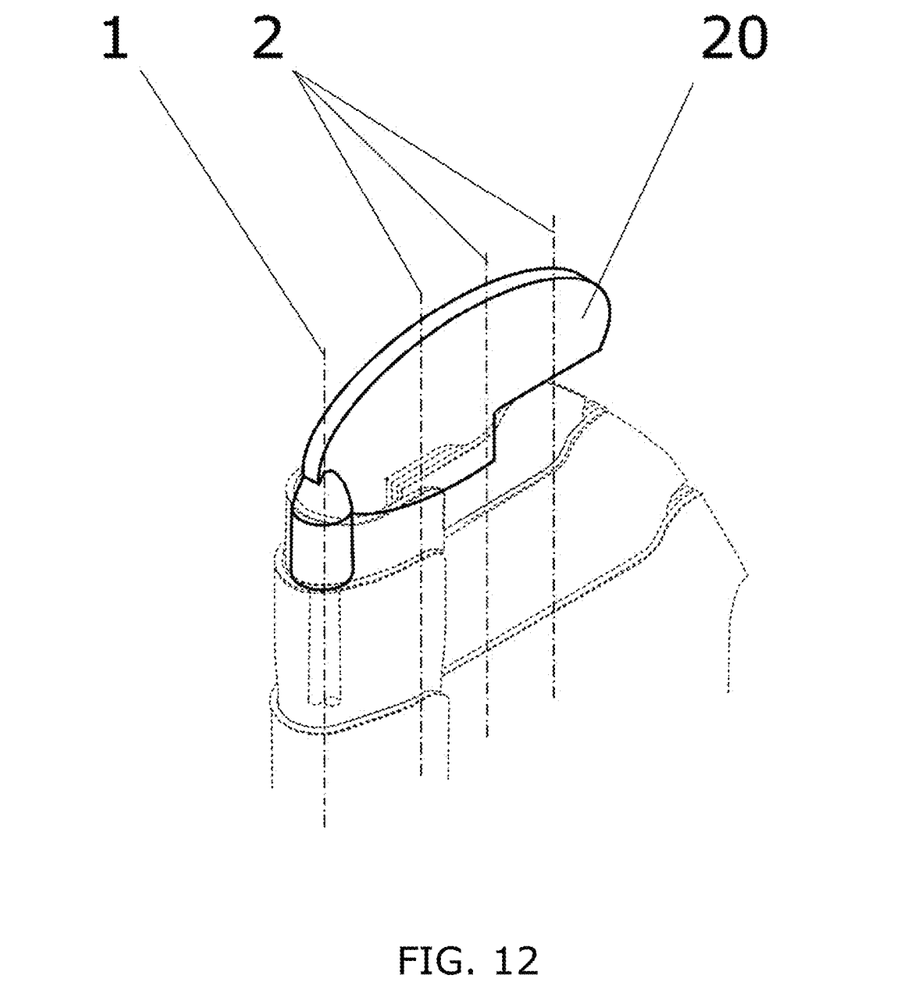
FIG. 12 shows a drawing of a blade end.

FIG. 12 shows the end of the blade structure 11. It shows the main mast 1, the secondary masts 2, and the blade tip element 20. The blade tip element 20 is made of an elastic material and is in part self-adjusting. The blade tip element 20 participates in influencing vortices at the tip of the blades, thereby influencing the degree of loss at the tip of the blades.

Figure 13:
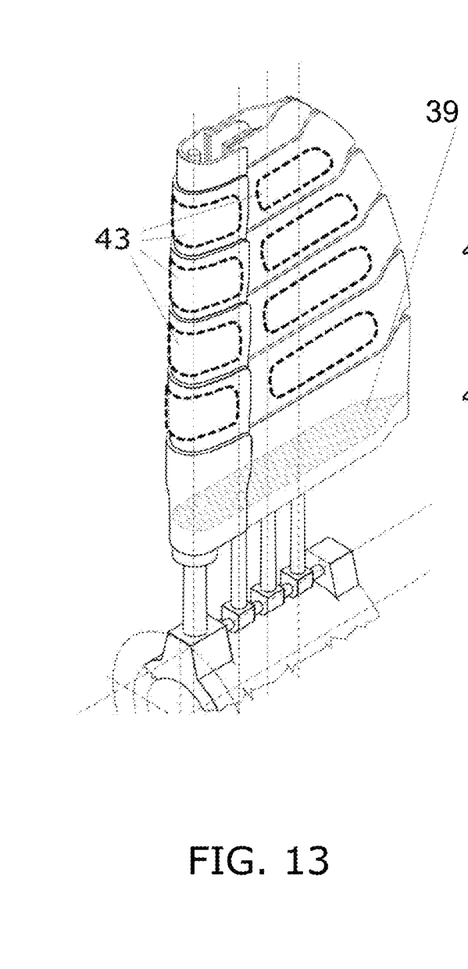
FIG. 13 shows a drawing of an implementation form of the blade structure with aerodynamic profile parts.
Figure 14:
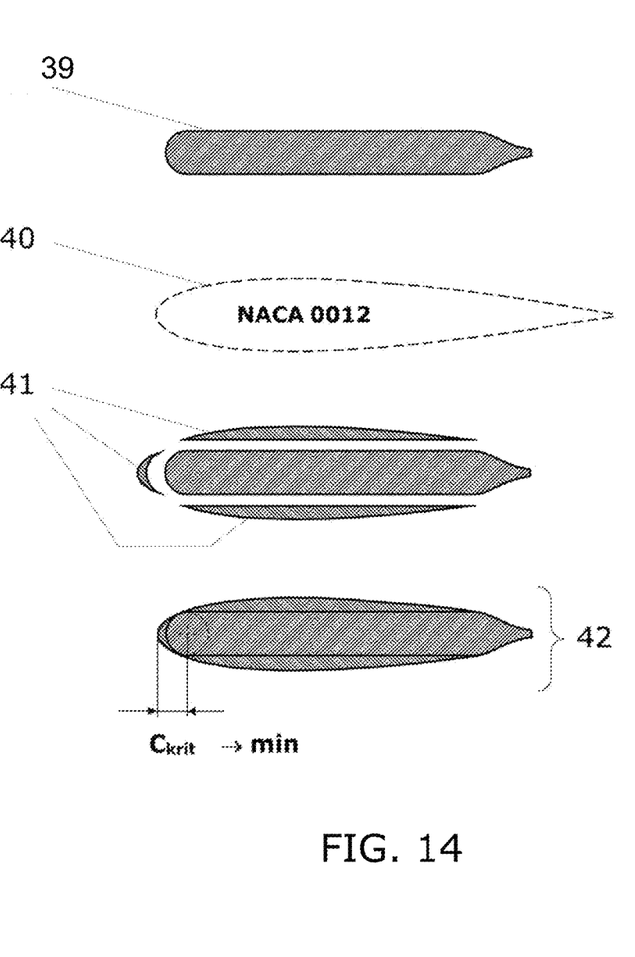
FIG. 14 shows a blade section with profile parts.

FIG. 13 shows an implementation form of the blade structure 11. FIG. 13 indicates the locations to fix aerodynamic trimming pieces 43 where the elements of aerodynamic profile trimming 41, shown on FIG. 14, may be placed. FIG. 14 shows the outline of the section according to NACA 0012, as well as the blade section untrimmed 39, the elements of aerodynamic profile trimming 41, and the aerodynamically trimmed blade section 42. The element of aerodynamic profile trimmings 41 may be placed onto the lateral pieces of skin module 6 in strips, meaning that they are in similar positions on each lateral piece of skin module 6, and they exert similar and optimized aerodynamic effect on the blade structure 11.

The invention has numerous advantages. It is advantageous that it is interchangeable with currently used propeller structures. This is achieved by using only one hydraulic cylinder for each propeller. It is possible to avoid extreme speed values for the blade tips that might approach or exceed the speed of sound. This ensures quieter operation and can improve safety. It is not necessary for the skin to be hermetically sealed, so more advantageous propeller structures can be formed.

The aerodynamic phenomena characteristic of stalling can be avoided along the surface of the propeller, and, overall, it allows the propeller to be operated at maximum or near-maximum efficiency in a wider speed range.

By providing a better approach to optimal twisting, the propeller implemented according to the invention outperforms propellers representing the state of the art in terms of power/efficiency. It is not forced to rotate the blade tips at a speed close to or above the speed of sound, thus avoiding modes of operation with increased losses. The blade angle can be regulated in a wide range without the blades spinning out of the wind (partially or completely), i.e., stalling or braking flight as a windmill.

A propeller fitted with blades according to the invention is able to avoid stalling/windmilling modes in a wider range, and its performance will be greater than that of similar rigid-blade propellers even with increased crosswinds (including tilted flight).

The blades according to the invention are capable of providing the same or better performance at higher speeds by operating at lower blade tip speeds but with greater twist. This means less noise and greater efficiency compared to solutions representing the state of the art.

For blades according to the invention, the blade angle (the angle of adjustment of the sections, i.e., the angle between the section chord and the plane of rotation) is minimal at a higher degree of twisting. Reducing the twist gradually means increasing the blade angles; in practice this may be expedient e.g., at acceleration. The proposed design ensures that the adjustment angle distribution of the sections (along the radius) is approximately equal to the angle of the resultant airflow along the blade (resultant airflow) with the plane of rotation. The blade angles can be increased or decreased as necessary or desirable while performing manoeuvres. The angles of each chord line vary not only with respect to the plane of rotation, but also with respect to each other. The latter means twisting.

Using the proposed torsional propeller blades, a mathematical analytical match can be achieved between the direction of the chord lines of the blade sections and the direction of the resulting wind, at approximately all velocity and all radius values. This allows the blade angle to be optimal over a wide range of ADVANCE RATIO, which ensures high efficiency over a wide range of ADVANCE RATIO even at moderate rotary speed. Propeller efficiency is close to the theoretical maximum over a very wide range of selected cruising speeds.

A further advantage of the modular skin is that it takes advantage of the dominant, quasi-constant directions of flow measured on the surface of the propeller blade, and the individual deformation of the elements is minimal. This allows the modular skin to follow the deformations of the skeleton with low friction and without increasing the elastic resistance to movement of the skeleton elements, while keeping the outer surface of the propeller blade close to the aerodynamic optimum. The modular skin is easier to implement and has better manufacturability in comparison to deformable skins representing the state of the art.

Increasing efficiency results in fuel savings. If allowed by the engine power of the aircraft, the entire subsonic speed range can be flown with the same propeller, including both take-off efficiency (short and normal runways), comfortable manoeuvres, and flight stability at top speed.

An unexpected economic advantage, which also reduces production time, is that the production of blades in their contemporary complex spatial shape (e.g., 3D design/milling) becomes unnecessary. It is advantageous for both construction (including design and sizing) and manufacturing technology that most of the design work can be done in a plane (2D).

For electric aircraft, the more favourable (softer) torque characteristics and better controllability of electric motors are more pronounced in the wide working range of propellers fitted with blades according to the invention, and the number of available drive/steering optimum points increases. The given battery capacity, which is still generally a bottleneck today, allows a greater flight range when aircraft are driven with more efficient propellers.

The primary field of application of the invention is driving subsonic transport aircraft and drones. In addition to the above examples, the invention can be implemented in other forms within the scope of protection.

What is claimed is:

1. A propeller for aircraft, comprises a blade structure mounted onto a propeller hub, a servo unit, and a cantilevered base, wherein:
   the blade structure comprises a main mast, at least one secondary mast, and spacers,
   wherein the main mast is mounted onto the propeller hub and forms a spine of a leading edge of the blade structure, and
   the at least one secondary mast is mounted onto and aligned with the main mast, and the at least one secondary mast turns the spacers, the spacers comprise struts and are mounted onto the main mast, and the struts are covered by lateral pieces of a skin module, and the lateral pieces of the skin module are overlapping and flexible, and form a skin, wherein the at least one secondary mast is mounted onto a respective secondary mast base piece movable around an axis of rotation, which is either parallel to, or is the same as, the axis of rotation of the propeller hub, and the at least one secondary mast is connected to a tilting hub of spaced battens.

2. The propeller according to claim 1, wherein the struts embrace in a fork-like manner the at least one secondary mast, wherein the struts are turnable by the at least one secondary mast.

3. The propeller according to claim 1, wherein:

the main mast is connected to the propeller hub through a hub of first spaced battens, a gear fixed to the hub of first spaced battens is associated to the hub of the first spaced battens, and a rack and a slider plate are associated to the gear fixed to the hub of the first spaced battens.

4. The propeller according to claim 1, wherein:

the blade structure is fitted with a flexible blade tip element, and the lateral pieces of the skin module are fitted with aerodynamic elements of aerodynamic profile trimming.

5. The propeller according to claim 1, wherein:

an axis of the main mast is parallel to the leading edge of the blade structure, the main mast and parts of the spacers mounted onto the main mast are covered by frontal pieces of the skin module, the frontal pieces of the skin module are connected to the lateral pieces of the skin module, and the lateral pieces of the skin module and the frontal pieces of the skin module form a modular unit of the skin.

6. The propeller according to claim 2, wherein:

an axis of the main mast is parallel to the leading edge of the blade structure, the main mast and parts of the spacers mounted onto the main mast are covered by frontal pieces of the skin module, the frontal pieces of the skin module are connected to the lateral pieces of the skin module, and the lateral pieces of the skin module and the frontal pieces of the skin module form a modular unit of the skin.

7. The propeller according to claim 1, wherein the further away from the propeller hub, the smaller a diameter of a cross-section of the main mast and the at least one secondary mast becomes.

8. The propeller according to claim 2, wherein the further away from the propeller hub, the smaller a diameter of a cross-section of the main mast and the at least one secondary mast becomes.

9. The propeller according to claim 1, wherein:

the main mast is connected to the propeller hub through a hub of first spaced battens, a gear fixed to the hub of second spaced battens is associated to the hub of the first spaced battens, and a rack and a slider plate are associated to the gear fixed to the hub of the first spaced battens.

* * * * *